United States Patent
Hyosong

(12) 
(10) Patent No.: US 6,923,872 B2
(45) Date of Patent: Aug. 2, 2005

(54) ARRANGEMENT AND METHOD FOR CLEANING FINE SOLID PARTICLES FROM A CONTINUOUSLY FLOWING LIQUID SUSPENSION

(76) Inventor: M. Lee Hyosong, Maimvagen 20, Tumba (SE), SE-147 00

( * ) Notice: Subject to any disclaimer, the term of this patent is extended or adjusted under 35 U.S.C. 154(b) by 407 days.

(21) Appl. No.: 10/142,947

(22) Filed: May 13, 2002

(65) Prior Publication Data

US 2002/0166576 A1 Nov. 14, 2002

(30) Foreign Application Priority Data

May 14, 2001 (SE) ................................................ 0101684
Sep. 18, 2001 (SE) ................................................ 0103096

(51) Int. Cl.[7] .................................................. B08B 7/04
(52) U.S. Cl. ........................... 134/32; 134/25.1; 134/61; 134/182
(58) Field of Search ............................ 134/32, 25.1, 61, 134/182; 210/189, 767, 800, 226, 532.1

(56) References Cited

U.S. PATENT DOCUMENTS

| | | | |
|---|---|---|---|
| 863,168 A | * 8/1907 | Griswold, Jr. ............... | 422/261 |
| 3,552,554 A | * 1/1971 | Olgard ....................... | 210/519 |
| 3,706,384 A | * 12/1972 | Weijman-Hane ........... | 210/519 |
| 3,862,033 A | * 1/1975 | Rozkydalek ................. | 210/738 |
| 4,123,365 A | * 10/1978 | Middelbeek ................. | 210/521 |
| 4,156,644 A | * 5/1979 | Richard ...................... | 210/748 |
| 4,351,733 A | * 9/1982 | Salzer et al. ................ | 210/738 |
| 4,559,141 A | * 12/1985 | Gyulavari .................... | 210/521 |
| 4,595,504 A | * 6/1986 | Hellman et al. ............ | 210/519 |
| 4,883,603 A | * 11/1989 | Roggenstein et al. ....... | 210/802 |
| 5,049,278 A | 9/1991 | Galper | |
| 5,397,472 A | * 3/1995 | Bouchard .................... | 210/519 |
| 5,536,409 A | * 7/1996 | Dunkers ...................... | 210/519 |
| 5,554,301 A | * 9/1996 | Rippetoe et al. ............ | 210/748 |
| 5,700,378 A | * 12/1997 | Lee et al. .................... | 210/771 |
| 5,947,299 A | * 9/1999 | Vazquez et al. ............ | 209/157 |
| 6,190,554 B1 | 2/2001 | Mandt | |
| 6,592,754 B2 | * 7/2003 | Chilibeck .................... | 210/137 |
| 6,676,832 B2 | * 1/2004 | de Bruijn et al. ........... | 210/163 |

* cited by examiner

Primary Examiner—Alexander Markoff
(74) Attorney, Agent, or Firm—Nixon & Vanderhye P.C.

(57) ABSTRACT

The invention relates to an arrangement and a method for cleaning fine solid particles from a continuously flowing liquid suspension. According to the invention, alternate emptying of cleaned liquid in at least two decanting chambers (34, 36) of the cleaning arrangement (10) is brought about by alternately opening and closing valve units (48, 50) coordinated with outlets (44, 46) of the decanting chambers (34, 36). Alternatively, valves in feeds to at least two separate inlet tanks of the cleaning arrangement can be opened and closed alternately in order to bring about a continuous outflow of cleaned liquid.

15 Claims, 6 Drawing Sheets

ARRANGEMENT AND METHOD FOR CLEANING FINE SOLID PARTICLES FROM A CONTINUOUSLY FLOWING LIQUID SUSPENSION

TECHNICAL FIELD

The present invention relates generally to cleaning liquid suspensions containing very fine solid particles, such as coolants containing, for example, solid particles originating from glass-grinding with a dimension down to roughly 0.5 $\mu$cm, that is to say solid particles which are very difficult to separate from the liquid phase on account of their small size.

More specifically, the invention relates to inter alia an arrangement for cleaning a continuously flowing liquid suspension of such a type, where the arrangement comprises an inlet tank, a feed pipe opening into the inlet tank for continuously supplying the liquid suspension to be cleaned, a sedimentation chamber unit located downstream of the inlet tank, a particle-separating unit which is located in the sedimentation chamber unit and contains a plurality of parallel, adjacent surface elements inclined at a great angle to the horizontal plane, at least two decanting chambers, located above and downstream of the sedimentation chamber unit, with an outlet for cleaned liquid, and a sediment sludge outlet located in a bottom portion of the sedimentation chamber unit.

The invention also relates to an arrangement of equivalent type, where the arrangement comprises at least two separate inlet tanks, a feed pipe opening into each inlet tank for supplying the liquid suspension to be cleaned, a sedimentation chamber unit located downstream of each inlet tank, a particle-separating unit which is located in the sedimentation chamber unit and contains a plurality of parallel, adjacent surface elements inclined at a great angle to the horizontal plane, a decanting chamber, located above and downstream of the respective sedimentation chamber, with an outlet for cleaned liquid, and a sediment sludge outlet located in a bottom portion of the sedimentation chamber unit.

The present invention also relates to methods of cleaning fine solid particles from a continuously flowing liquid suspension.

BACKGROUND OF THE INVENTION

The separation of very fine solid particles of a size of roughly 0.5 to 5 $\mu$m from liquid suspensions by sedimentation normally requires very long sedimentation times as the settling rate of the particles is very slow. This means that the particles must not be influenced by the flow of the liquid during sedimentation, which in practice means that effective sedimentation can be carried out only in a stationary liquid mass, as the particles are influenced by nothing other than the forces of gravity.

SE-B-7509004-3, for example, describes an arrangement of the type described in the introduction for separating a lighter liquid phase together with heavier solid fractions from a heavier liquid phase of a liquid mixture. Such an arrangement would not, however, be capable of or suitable for continuous separation of very fine solid particles which are difficult to separate of the type referred to above on account of excessive disturbance caused by the liquid suspension flowing through.

THE OBJECT AND SOLUTION OF THE INVENTION

One object of the present invention is to produce an arrangement which makes possible effective continuous cleaning of a liquid suspension containing very fine particles, where the arrangement has relatively small dimensions and makes possible separation in a relatively short time. To this end, the arrangement according to the invention is characterized by the features indicated in the independent and dependent arrangement claims below.

Another object of the present invention is to propose a method which makes possible effective continuous cleaning of a liquid suspension containing very fine particles in a relatively short time. To this end, the method according to the invention is characterized by the features indicated in the independent method claims below.

Further objects and features of arrangements and methods according to the invention will emerge in greater detail from the detailed description given below with reference to accompanying drawing figures.

DETAILED DESCRIPTION OF PREFERRED EMBODIMENTS

Figure 1:
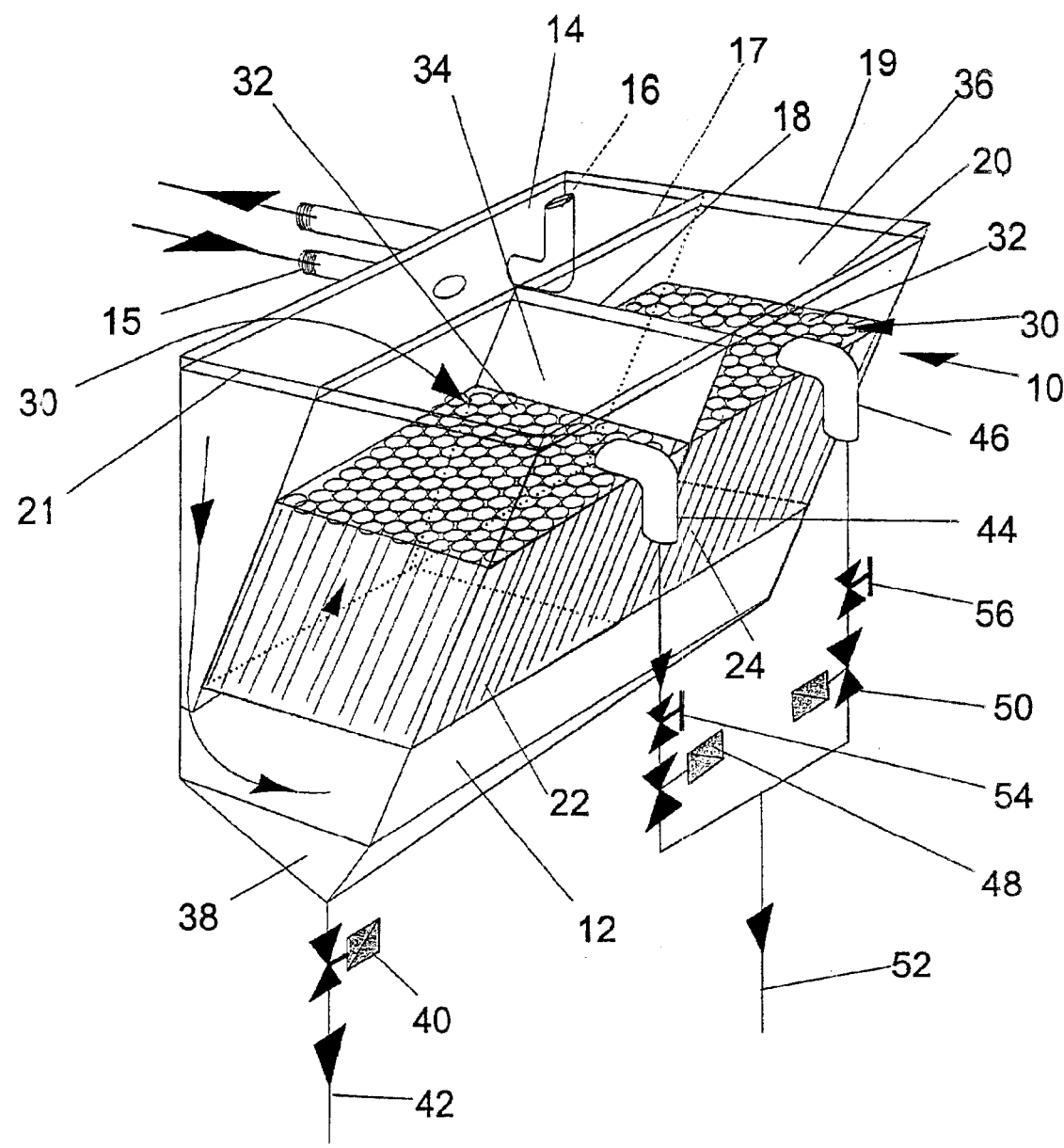
FIG. 1 is a diagrammatic perspective view of a first embodiment of an arrangement according to the present invention.

In FIG. 1, a first embodiment of an arrangement according to the invention is designated generally by reference number 10. The arrangement 10 comprises a housing 12 which accommodates an inlet tank 14 for the liquid suspension to be cleaned. The liquid suspension, which contains solid particles of extremely small dimensions (down to roughly 0.5 $\mu$m or even smaller), is supplied to the tank 14 continuously via a feed pipe 15. An overflow pipe 16 in an upper part of the tank 14 ensures that the liquid level in the tank is kept constant. Two sedimentation chambers 22 and 24, which are bounded by inner intermediate walls 17, 18 and outer side walls 19, 20, 21 of the housing and in each of which a particle-separating unit 30 in the form of a plurality of parallel, adjacent surface-creating elements inclined at a great angle to the horizontal plane is mounted, communicate with the inlet tank 14. In the embodiment according to FIG. 1, these surface-creating, inclined elements consist of thin-walled tubular elements 32 of small diameter, for example roughly 3 mm. A respective decanting chamber 34 and 36 is located downstream of and above the sedimentation chambers 22, 24 in the housing 12 and is likewise delimited by said inner intermediate walls 17, 18 and outer walls 19, 20, 21. Upstream of and below the particle-separating unit 30 in each sedimentation chamber 22, 24, a sludge-collecting bottom trough 38 is formed in the housing 12. A bottom valve 40 can be opened when the sludge collected in the trough is to be emptied and led off via a sludge drain 42. An outlet 44, 46 leads cleaned liquid off from the respective decanting chambers 34, 36 to a common outlet line 52 via a respective openable and closable outlet valve 48, 50. A respective adjustable throttle valve 54, 56 can be coordinated with the outlet valves 48, 50 in order to make possible accurate individual adjustment of the liquid flow from the decanting chambers 34, 36.

The arrangement 10 in FIG. 1 for continuous cleaning of a liquid suspension contaminated with fine particles functions as follows: a flow of contaminated liquid is fed to the tank 14 via the feed pipe 15. The overflow pipe 16 ensures that the free liquid surface is kept at the same constant level in both the inlet tank 14 and the decanting chambers 34, 36 communicating therewith. On initial filling of the inlet tank 14, when the outlet valves 48, 50 are kept closed, the liquid suspension flows from the tank 14 via the bottom trough 38 and the sedimentation tubes 32 up into the decanting chambers 34, 36 to the predetermined liquid level. After a sufficiently long time, when the liquid has been allowed to become still, a large proportion of the very small solid particles in the liquid has sunk down and settled on the lower walls of the tubes 32 and in the bottom of the trough 38, the liquid mass in the decanting chambers 34, 36 having clarified and to a great extent been freed of solid particles. After this, continuous cleaning of the liquid suspension can be started by first opening only one outlet valve 48 and then allowing relatively slow emptying of the decanting chamber 34 concerned via its outlet 44 until the degree of contamination of the new liquid mass simultaneously flowing into the decanting chamber 34 has reached a predetermined maximum level at the outlet 44, which corresponds approximately to the time when a liquid volume present in the separating unit 30 has flowed out of the outlet 44. At this time, the outlet valve 48 is closed at the same time as the outlet valve 50 for the other decanting chamber 36 is opened, this chamber slowly being emptied of cleaned liquid through the outlet 46 and simultaneously being filled with new liquid from below until the degree of contamination of the liquid flowing out has reached a permitted maximum level. When this has happened, the outlet valve 50 is closed at the same time as the outlet valve 48 is opened again. By way of such alternate filling, cleaning and emptying of the liquid in the decanting chambers 34, 36, a continuous outflow of cleaned liquid can be obtained from the common outlet line 52 while a simultaneous continuous inflow of contaminated liquid suspension into the inlet tank 14 takes place. By means of the adjustable throttle valves 54, 56, the outflows from the respective decanting chambers 34, 36 can be regulated in such a manner that sufficient dwell and sedimentation time is obtained for the liquid suspension in the closed decanting chamber at the same time as minimum movement takes place in the liquid in the chamber being emptied.

Figure 2:
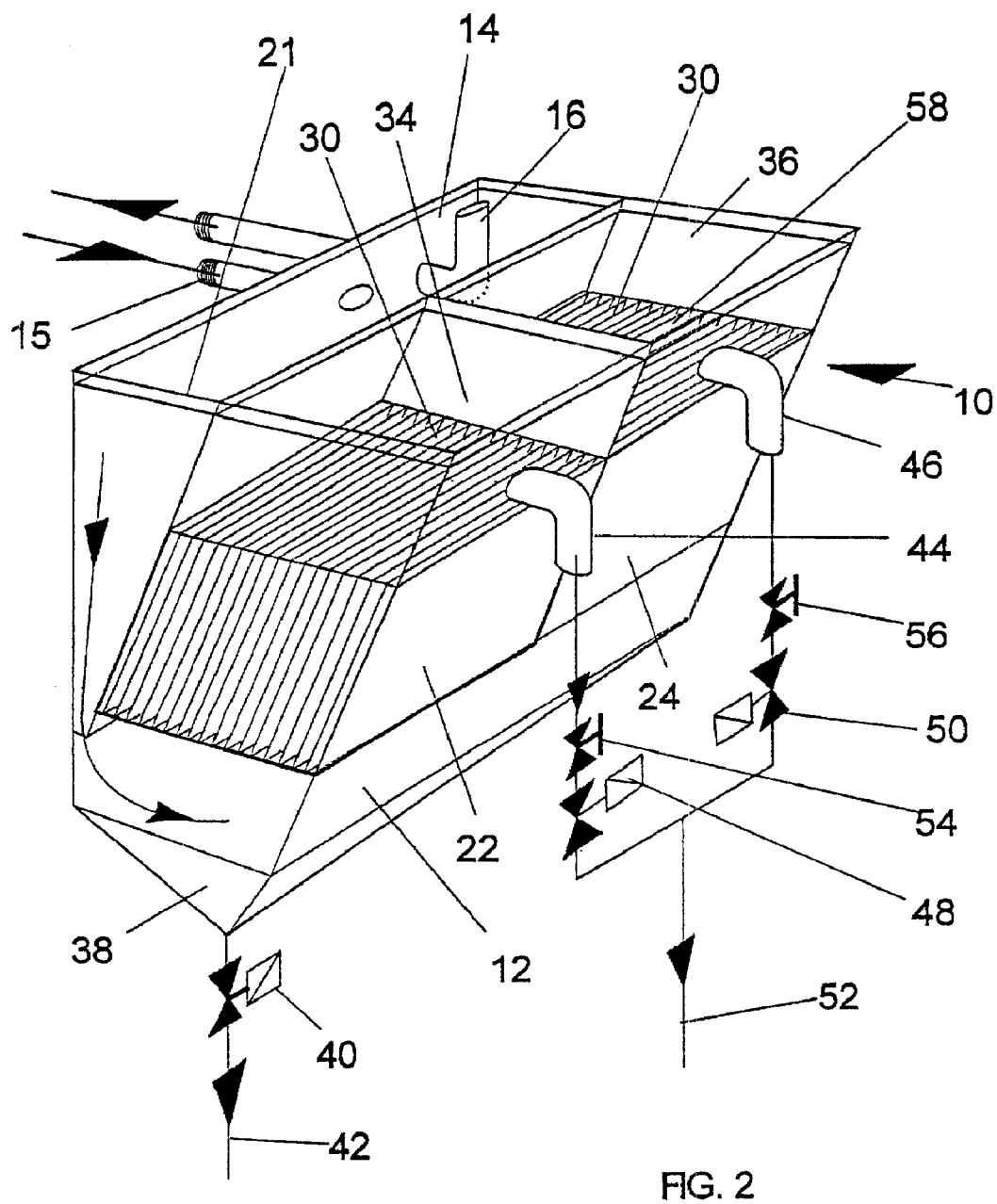
FIG. 2 is a view similar to FIG. 1 of a second embodiment of an arrangement according to the invention.

FIG. 2 shows an alternative embodiment of a cleaning arrangement according to the present invention, which corresponds to the embodiment in FIG. 1 with the difference that, instead of tubular elements 32, use is made of plane, parallel lamellar plates 58 as particle-separating sedimentation elements.

Figure 3:
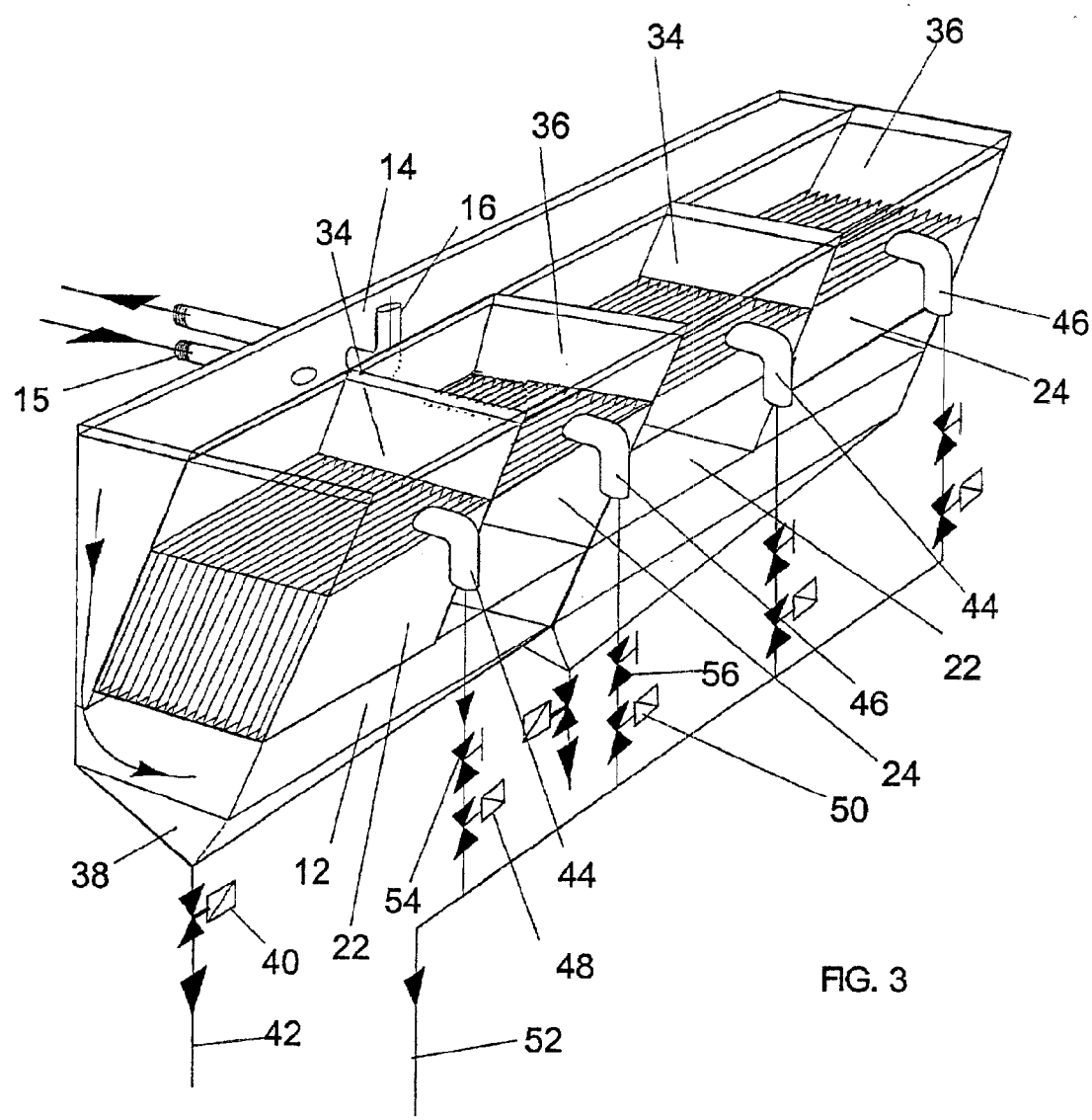
FIG. 3 is a view similar to FIG. 1 of a third embodiment of an arrangement according to the invention.

FIG. 3 shows another embodiment according to the invention, where the capacity of the cleaning arrangement has been increased by multiplying the number of sedimentation and decanting chambers 22, 24, 34, 36 to four. The inlet tank 14 is common to all these chambers. In this connection, decanting can take place sequentially in steps or in pairs so that a continuous outflow of cleaned liquid can be obtained in the common outlet line 52. The number of chambers can of course be varied arbitrarily in order to suit the application concerned.

Figure 4:
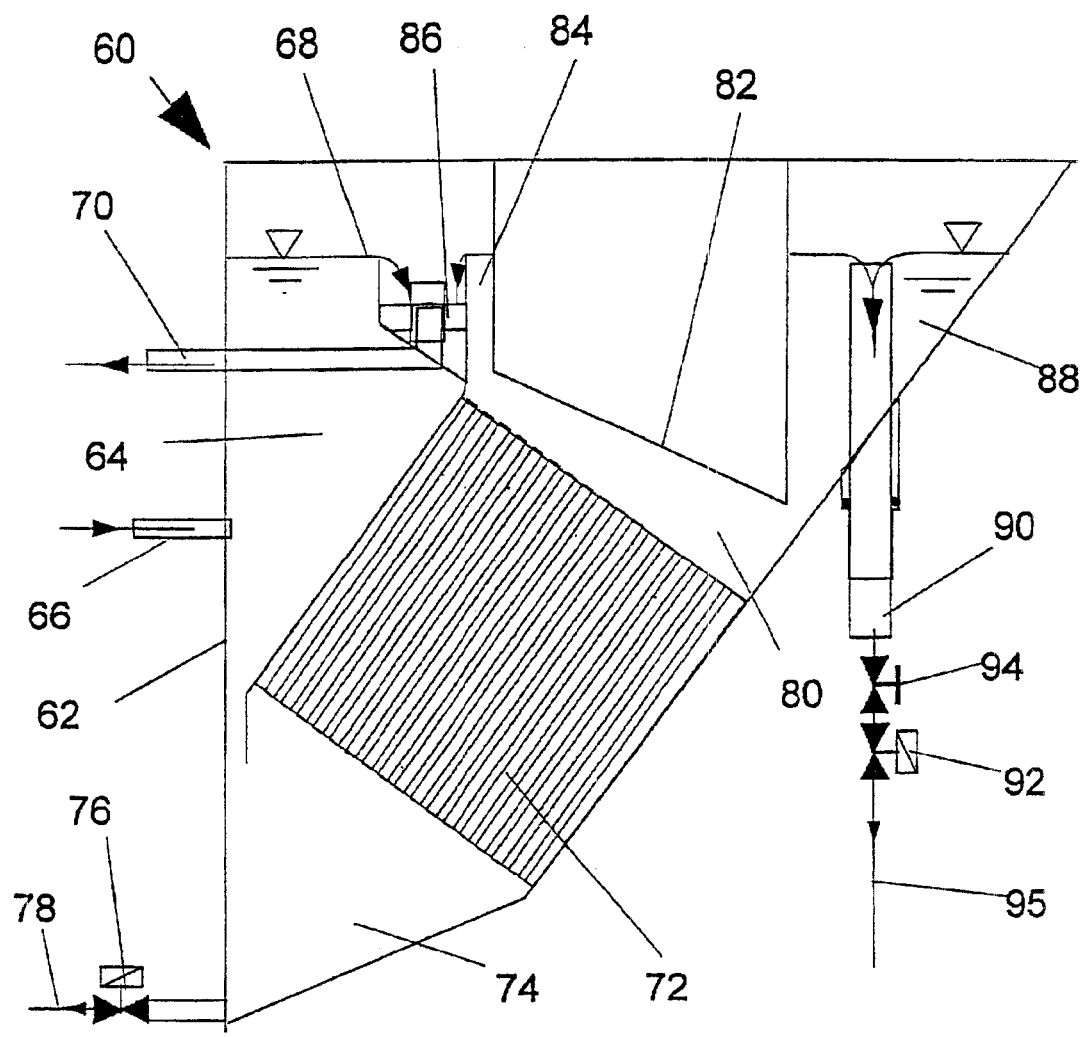
FIG. 4 is a diagrammatic side view of a fourth embodiment of an arrangement according to the invention.

FIG. 4 shows a side view of an alternative embodiment of a cleaning arrangement 60 according to the invention, which, at the same time as separation of fine solid particles, also makes possible continuous separation of a lighter liquid phase from a heavier liquid phase in a liquid suspension. In the same manner as in the embodiments in FIGS. 1–3, the arrangement comprises a housing 62 which accommodates an inlet tank 64 for the liquid suspension to be cleaned. The liquid suspension, which contains a heavier liquid phase, for example water, a lighter liquid phase, for example oil, and also fine solid particles, for example grinding particles originating from, for example, machining of glass material, is fed continuously to the tank 64 via a feed pipe 66. An overflow 68 with a return line 70 in the upper part of the tank 64 ensures a constant liquid level in the tank 64. At least two separate sedimentation chambers, which are arranged parallel to the tank 64 and in each of which a particle-separating unit 72 in the form of a plurality of parallel, adjacent surface-creating elements inclined at a great angle to the horizontal, such as fine tubular elements or plane lamellar plates, is mounted, communicate with the inlet tank 64. Upstream of and below the particle-separating unit 72, a sludge-collecting bottom trough 74 is formed in the housing 62. A bottom valve 76 can be opened when the sludge collected in the trough is to be emptied and led off via a sludge drain 78. A chamber 80 immediately above and downstream of the particle-separating unit 72 in the housing 62 is delimited at the top by a light-phase-separating inclined top plate 82 which intercepts rising light-phase liquid, for example oil particles, in the liquid suspension and diverts it diagonally up to the left to a light-phase outlet 84, where it can run over into a collecting trough 86. The heavier liquid phase of the liquid suspension flowing out of the separating unit 72 flows up to a decanting chamber 88, located higher up and to the right in FIG. 4, where cleaned heavy-phase liquid can, in the same manner as in the embodiments in FIGS. 1–3, flow out alternately from each decanting chamber 88 via an outlet 90, when an outlet valve 92 arranged downstream of the outlet 90 is kept open. The flow from the outlet 90 to a common outlet line 95 can be finely regulated by means of a throttle valve 94. This embodiment therefore functions in the same way as the previous embodiments, apart from the fact that, in addition, a light-phase liquid can be separated from a heavier liquid phase.

Figure 5:
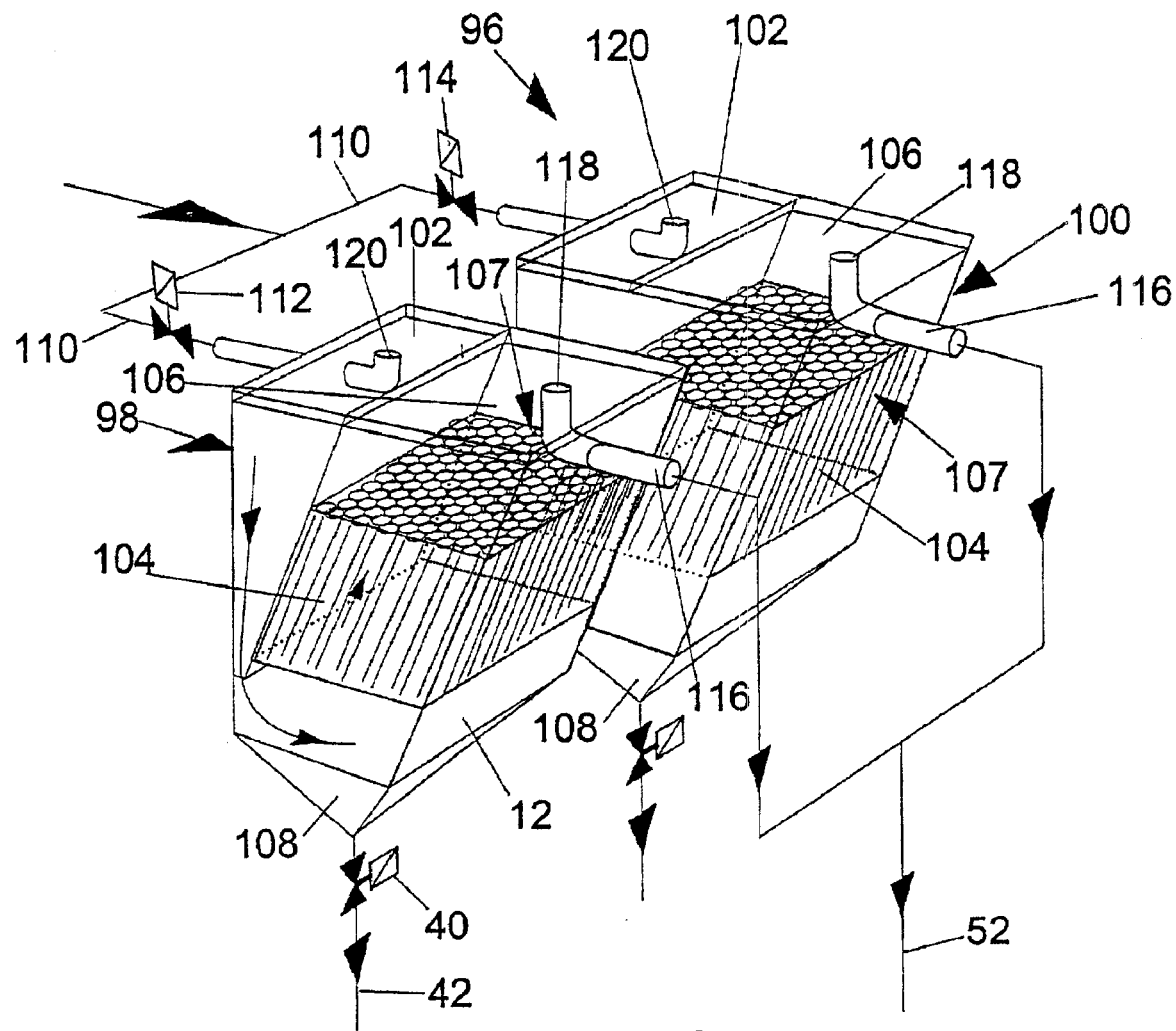
FIG. 5 is a perspective view of a fifth embodiment of an arrangement according to the invention.

FIG. 5 shows a further embodiment of a cleaning arrangement according to the invention. In this embodiment, the arrangement 96 comprises two entirely separate cleaning units 98, 100, each having its own inlet tank 102, sedimentation and decanting chambers 104 and, respectively, 106, a particle-separating unit 107 and a sludge collecting trough 108 in the same way as described above in the other embodiments. In contrast to the other embodiments, each feed line 110 is provided with an openable and closable valve 112 and, respectively, 114, while the outlets 116 from the decanting chambers 106 do not, for this reason, require any valves. The inlet tank 102 does not require its own overflow either in order to obtain the same liquid level in the inlet tank 102 and in the decanting chamber 106, as the admission opening 118 of the outlets 116 lies at the same level as the inlet opening 120 of the feed line 110. This embodiment also therefore makes possible cleaning of a continuous inflow of contaminated liquid suspension by alternately opening and closing the inlet valves 112, 114 in order in this way alternately to draw off cleaned liquid from the decanting chambers 106 to a common outlet line 52. In this case also, emptying of a decanting chamber 106 begins when the requisite degree of cleanness of the liquid therein has been achieved and when the degree of contamination of the liquid flowing out of another cleaning unit 98 or 100 has risen to a maximum permitted value. This embodiment can also have an arbitrary number of separate cleaning arrangements, which are combined with one another in order to increase the capacity for separating microparticles, which are difficult to separate, from liquid suspensions.

Figure 6:
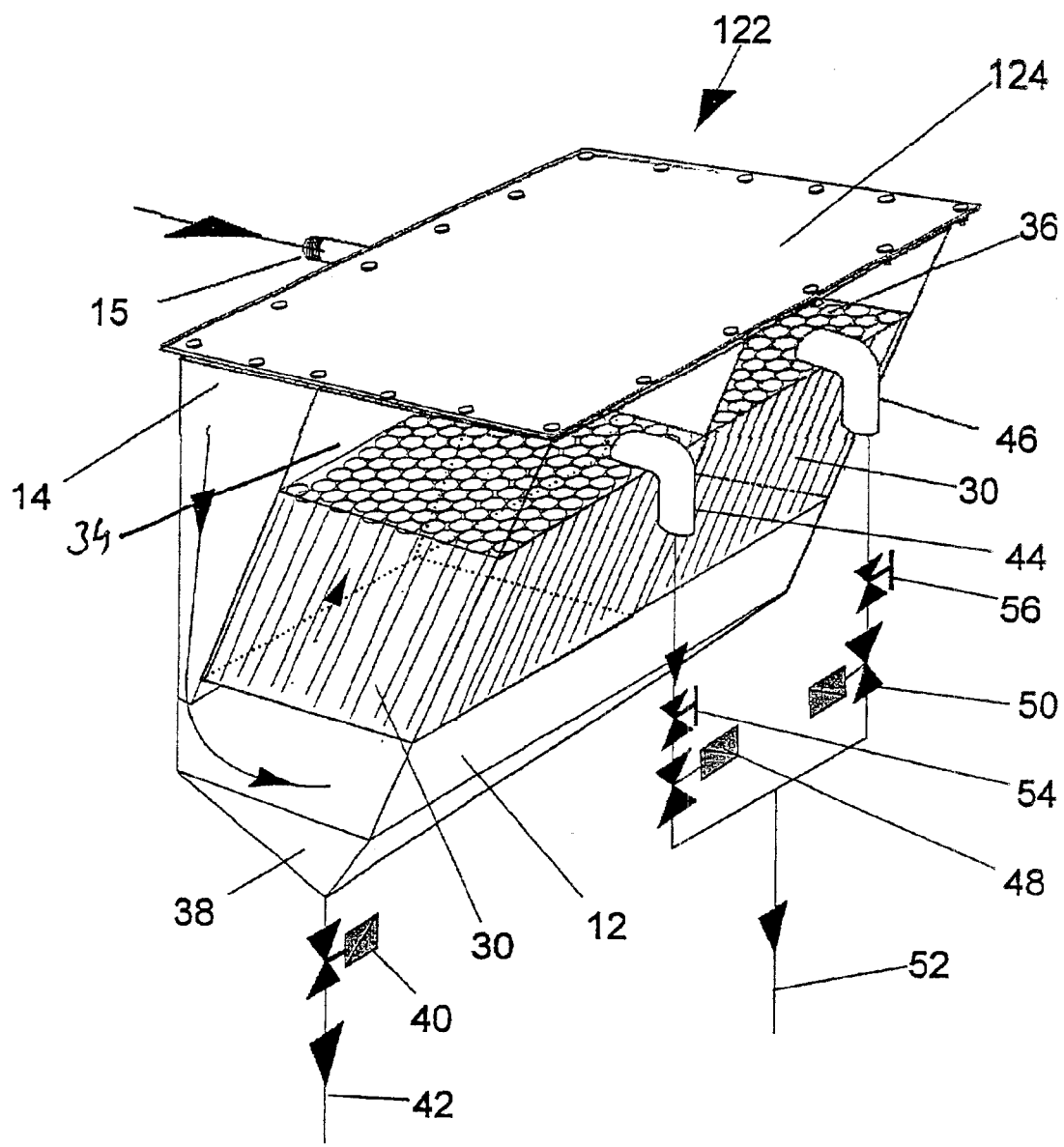
FIG. 6 is a perspective view of a further embodiment of an arrangement according to the invention.

FIG. 6 shows a further embodiment of an arrangement according to the invention for cleaning fine solid particles from a continuously flowing liquid suspension. This embodiment differs from those shown in FIGS. 1–4 in that it is made as a hermetically sealed unit 122 with a tightly fitting cover 124, mounted above the inlet tank 14 and the decanting chambers 34, 36. This makes it possible to dispense with an overflow in the inlet tank 14 and at the same time to connect the feed 15 to a pressure generator, for example a motor-driven pump (not shown), which constantly keeps the inlet tank 14 and the decanting chambers 34, 36 completely filled and pressurized with liquid up to the cover 124. In the same way as in the embodiments according to FIGS. 1–4, the decanting chambers 34, 36 are emptied alternately by the valve units 48, 50 associated with the outlets 44, 46 being opened and closed alternately with one another. The respective valve unit 48 and 50 is kept open for as long as it takes for a cleaned liquid volume, which corresponds to the liquid volume in the particle-separating unit 30, to leave the decanting chamber 34, 36 at a slow flow rate which does not disturb the particle sediment which is collected in the unit 30 and can fall down into the bottom trough 38 and is periodically emptied and led off via the sludge drain 42 when the bottom valve 40 is opened.

What is claimed is:

1. An arrangement for cleaning fine solid particles from a continuously flowing liquid suspension, comprising an inlet tank, a feed pipe opening into the inlet tank for continuously supplying the liquid suspension to be cleaned, a sedimentation chamber unit located downstream of the inlet tank, a particle-separating unit located in the sedimentation chamber unit and contains a plurality of parallel, adjacent surface elements inclined at an angle to the horizontal plane, at least two decanting chambers, located above and downstream of the sedimentation chamber unit, with an outlet for cleaned liquid, and a sediment sludge outlet located in a bottom portion of the sedimentation chamber unit, wherein the sedimentation chamber unit comprises at least two sedimentation chambers which are separate from one another, are connected parallel to the inlet tank and each have their own decanting chamber, wherein valve units, coordinated with separate outlets from the respective decanting chambers, are arranged so as to be opened and closed alternately with one another, and wherein an overflow in the inlet tank is arranged so as to keep the liquid surface in the inlet tank and the separate decanting chambers at the same or essentially the same constant level.

2. The arrangement as claimed in claim 1, wherein each valve unit comprises a flow-regulating throttle valve.

3. The arrangement as claimed in claim 1, wherein the outlets from the decanting chambers are interconnected downstream of the valve units.

4. The arrangement as claimed in claim 1, wherein the surface elements consist of plane lamellar plates.

5. The arrangement as claimed in claim 1, wherein the surface elements consist of tightly packed tubes.

6. The arrangement as claimed in claim 1, wherein, for additional separation of a lighter liquid phase from a heavier liquid phase of the liquid suspension, each decanting chamber has an inclined wall which is located above the sedimentation chamber, lies below the liquid level in the decanting chamber and, at the top, opens into a light-phase outlet.

7. The arrangement as claimed in claim 6, wherein the inclined wall forms a top of a primary chamber, located above the sedimentation chamber, of the decanting chamber and inclines away from a secondary part, located at the side and higher up, of the decanting chamber, where the outlet for the heavier liquid phase is located.

8. A method of cleaning fine solid particles from a continuously flowing liquid suspension, which comprises the steps
   a) leading the continuously flowing liquid suspension to an inlet tank,
   b) making the liquid suspension in the inlet tank flow slowly and alternately to and through at least two sedimentation chambers which are separate from one another, connected parallel to and downstream of the inlet tank and in which a particle-separating unit containing a plurality of parallel, adjacent surface elements inclined at an angle to the horizontal plane is arranged, and then to a decanting chamber located above and downstream of the respective sedimentation chamber,
   c) a liquid level which is constant and essentially the same being maintained in the inlet tank and in the decanting chambers, and
   d) the alternate flow of liquid suspension to the sedimentation chambers being brought about by alternately opening and closing valve units coordinated with separate outlets from the respective decanting chambers.

9. A method of cleaning fine solid particles from a continuously flowing liquid suspension, which comprises the steps
   a) leading the continuously flowing liquid suspension to a hermetically sealed inlet tank in order to fill the latter completely,
   b) making the liquid suspension in the inlet tank flow alternately to and through at least two sedimentation chambers which are separate from one another, connected parallel to and downstream of the inlet tank and in which a particle-separating unit containing a plurality of parallel, adjacent surface elements inclined at a great angle to the horizontal plane is arranged, and then to a hermetically sealed decanting chamber located above and downstream of the respective sedimentation chamber,
   c) the decanting chambers being filled in their entirety with cleaned liquid, and
   d) the alternate flow of liquid suspension to the sedimentation chambers being brought about by alternately opening and closing valve units coordinated with separate outlets from the respective decanting chambers.

10. An arrangement for cleaning fine solid particles from a continuously flowing liquid suspension, comprising an inlet tank, a feed pipe opening into the inlet tank for continuously supplying the liquid suspension to be cleaned, a sedimentation chamber unit located downstream of the inlet tank, a particle-separating unit which is located in the sedimentation chamber unit and contains a plurality of parallel, adjacent surface elements inclined at an angle to the horizontal plane, at least two decanting chambers, located above and downstream of the sedimentation chamber unit, with an outlet for cleaned liquid, and a sediment sludge outlet located in a bottom portion of the sedimentation chamber unit, wherein the sedimentation chamber unit comprises at least two sedimentation chambers which are separate from one another, are connected parallel to the inlet tank and each have their own decanting chamber, wherein valve units, coordinated with separate outlets from the respective decanting chambers, are arranged so as to be opened and closed alternately with one another, and wherein the inlet tank and the sedimentation chamber unit are hermetically sealed in order to be kept completely filled with liquid.

11. The arrangement as claimed in claim 10, wherein the inlet tank and the decanting chambers have a common top wall.

12. The arrangement as claimed in claim 10, wherein each valve unit comprises a flow-regulating throttle valve.

13. The arrangement as claimed in claim 10, wherein the outlets from the decanting chambers are interconnected downstream of the valve units.

14. The arrangement as claimed in claim 10, wherein the surface elements consist of plane lamellar plates.

15. The arrangement as claimed in claim 10, wherein the surface elements consist of tightly packed tubes.

* * * * *